J. INGRAM.

Water Back for Ranges.

No. 738.

Reissued June 21, 1859.

Witnesses:

Samuel W. Gault.

Thomas G. Harding.

Inventor:

James Ingram.

N. PETERS, Photo-Lithographer, Washington, D. C.

UNITED STATES PATENT OFFICE.

JAMES INGRAM, OF NEW YORK, N. Y.

IMPROVEMENT IN WATER BACKS FOR RANGES.

Specification forming part of Letters Patent No. 19,368, dated February 16, 1858; Reissue No. 738, dated June 21, 1859.

*To all whom it may concern:*

Be it known that I, JAMES INGRAM, of the city, county, and State of New York, have invented, made, and applied to use certain new and useful Improvements in Water-Backs for Ranges; and I do hereby declare that the following is a full, clear, and exact description of the construction and operation of the same, reference being had to the annexed drawings, making part of this specification, wherein—

Figure 2:
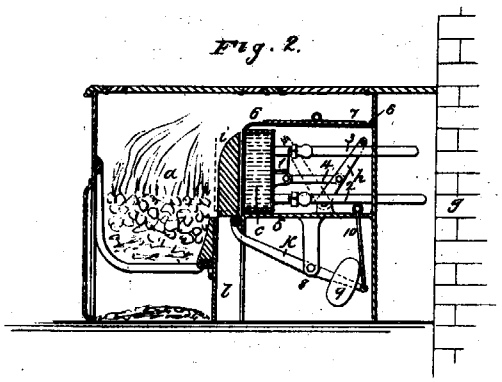
Figure 1:
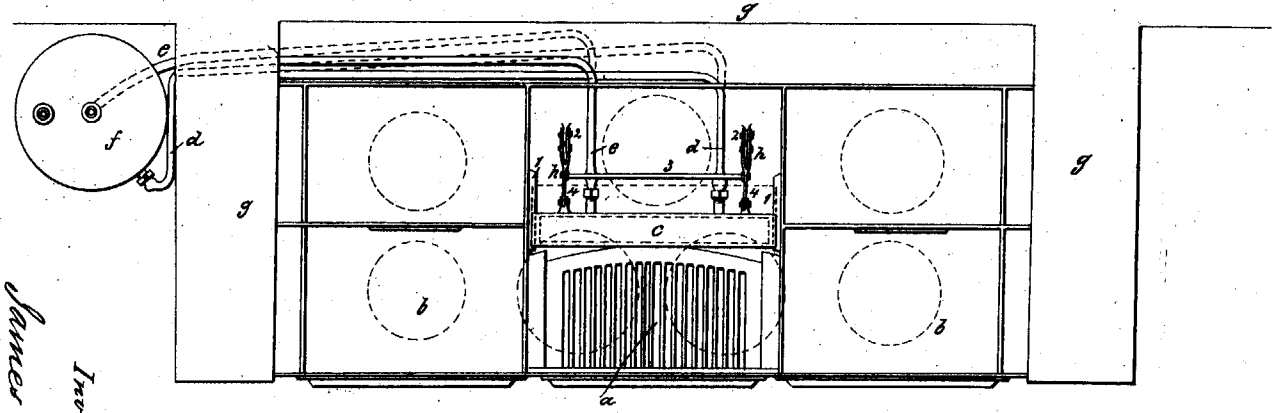

Figure 1 is a plan of a cooking-range, with the top plate removed to show my improved water-back; and Fig. 2 is a vertical section of the range, near the center of the same.

Similar marks of reference indicate the same parts.

Many cooking-ranges, both in the city and country, where a competent supply of water exists, are fitted with water-backs to heat, by circulation, the water contained in a boiler standing near the said range. The water-back, to be fully operative, is in contact with the fire, and will heat water sufficiently hot for washing and similar domestic purposes. When the range is being used for other purposes, particularly ironing, but little hot water is required, and an intense fire is in contact with the water-back; hence it is found practically that steam is often formed in the water-back, that drives the water out of the adjoining boiler, causing an overflow of the cistern, (if one be used,) and often collapsing the boiler and splitting the water-back, when the cold water rushes into the boiler, condensing the steam, and running into the highly-heated water-back, injuring or splitting the same.

Besides the foregoing difficulty, with water-backs, another often arises in country places, when a continued drought exhausts the reservoirs or wells and there is not sufficient for supplying the hot-water boiler. In this case the range cannot be used, for fear of burning out the empty water-back.

The nature of my said invention consists in setting the water-back in such a manner that a soapstone or fire-brick, or equivalent non-conducting substance, can be introduced between the fire and the water-back, thus obviating all the inconveniences and dangers before enumerated.

In the drawings, *a* is the fire-place of any desired character of range; *b b*, the ovens. The flues and other parts are to be of any usual character, and, not relating to the water-back, need no further description.

*c* is the water-back, (shown in its usual place in Fig. 1,) with the circulating-pipes *d* and *e* to the boiler *f*.

*g* is the brick-work or setting of the range.

In almost all cases the distance between the boiler *f* and water-back *c* is such that the pipes *d e* will spring two or three inches without disturbing the joints, if the parts are otherwise unobstructed. I therefore fit any water-back *c* to slide on supports 1 1, back and forth, and approach to or recede from the fire; and to move said water-back with facility I provide levers *h h* on fulcrums 2 2, joined together by a rod, 3, and connect said levers with the water back by links 4 4. The space in which the water-back moves is made tight by the bottom plate, 5, and top plate, 6, (which is provided with a cover, 7, to allow access to the levers *h*, to move the water-back,) to prevent any draft drawing heat under said water-back. When the water-back has been drawn away from the fire, a soapstone or fire-brick, *i*, is to be inserted between the fire and said back, and this may be placed in by hand and rest on a suitable ledge or support; or the said stone or fire-brick may be on one end of a lever, *k*, on a fulcrum, 8, and move up and down in the space *l*, Fig. 2, and be balanced by the weight 9, so that when the water-back is moved to the rear the lever and weight shall force up the intervening stone or brick, and when desired to increase the amount of heated water the lever *k* is to be acted on by the small rod 10, to depress the brick or stone, while the levers *h h'* are used to move the water back up to the fire again. My water-back can thus be in contact with the fire when required, or almost instantaneously protected from the same, in the manner and for the purposes before enumerated.

Besides the foregoing difficulties, it will be proper to mention the fact that heretofore, in case any of the plumbing-work in the house required repairs, so that the water had to be let off, the fire in the range had to be extinguished, and so remain until the repairs were completed, while with my water-back the range can be in use all the time, whether there is water in the back or not, and the water-back can be protected as desired without disturbing the pipes or requiring a range-maker or plumber, the same being done by the occupants of the house.

What I claim as my invention, and desire to secure by Letters Patent, is—

1. Protecting the water-back of ranges by the introduction of a movable fire-brick, soapstone, or equivalent material between the fire and said water-back, substantially as specified.

2. Arranging said water-back substantially as set forth, whereby the same can be moved away from the fire to allow space for introducing said protecting fire-brick or its equivalent, as specified.

3. In combination with said water-back, the lever *k* and weight *g*, or their equivalents, to move the intervening soapstone or fire-brick, substantially as specified.

In witness whereof I have hereunto set my signature this 17th day of May, 1859.

Witnesses: JAMES INGRAM.

CHAS. H. SMITH,

THOMAS G. HAROLD.